No. 666,686. Patented Jan. 29, 1901.
P. ORLANDO.
CASING FOR HARMONICAS.
(Application filed Nov. 27, 1900.)
(No Model.)
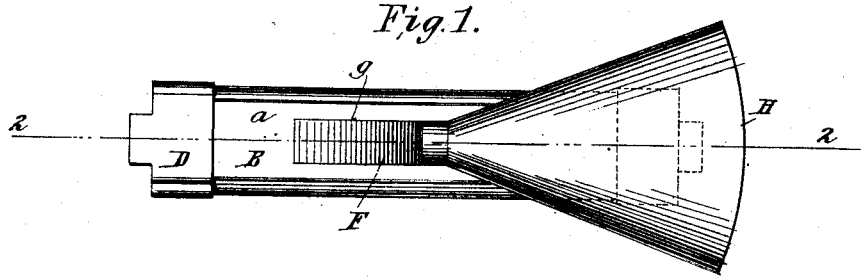
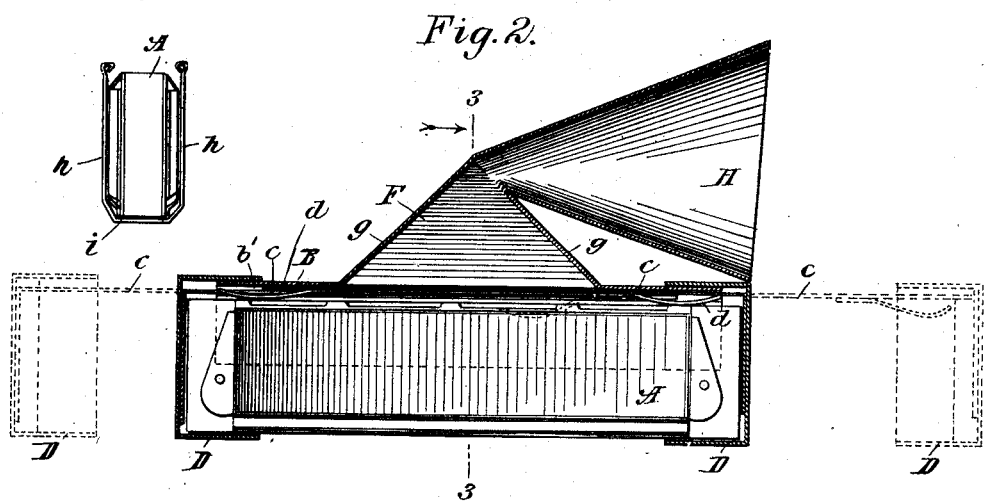
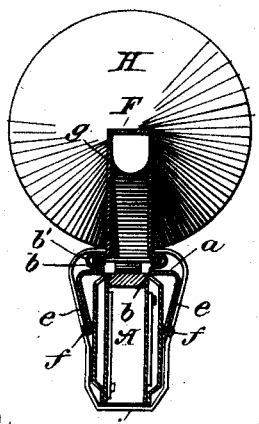
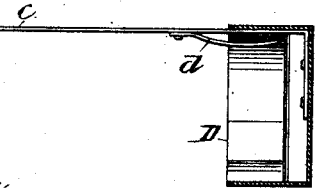
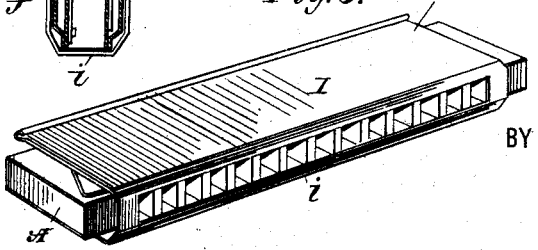
WITNESSES:
M. Van Nortwick
William P. Goebel
INVENTOR
Pietro Orlando
BY
George Cook
ATTORNEY
THE NORRIS PETERS CO., PHOTO-LITHO., WASHINGTON, D. C.

UNITED STATES PATENT OFFICE.

PIETRO ORLANDO, OF NEW YORK, N. Y.

CASING FOR HARMONICAS.

SPECIFICATION forming part of Letters Patent No. 666,686, dated January 29, 1901.

Application filed November 27, 1900. Serial No. 37,884. (No model.)

*To all whom it may concern:*

Be it known that I, PIETRO ORLANDO, a subject of the King of Italy, and a resident of New York, in the county of New York and State of New York, have made and invented certain new and useful Improvements in Casings for Harmonicas, of which the following is a specification.

My invention relates to an improvement in cases for harmonicas, whereby the sound from the same is directed through a funnel for controlling the sound and effect thereof, one object of the invention being to provide a device of this character whereby the instrument may be more easily and readily inserted and withdrawn from the case than is possible with those devices now in use.

A further object of my invention is to provide an article of this kind or character which shall be simple in construction and cheap to manufacture, and with these and other ends in view the invention consists in certain novel features of construction and combinations of parts, as will be hereinafter fully described, and pointed out in the claims.

In the accompanying drawings, Figure 1 is a top plan view of my improved case. Fig. 2 is a longitudinal sectional view taken on the line 2 2 of Fig. 1, the movable inclosing ends being shown in their open adjustment in dotted lines. Fig. 3 is a vertical sectional view taken on the line 3 3 of Fig. 2. Fig. 4 is a sectional detached view of one of the inclosing ends. Fig. 5 is a perspective view of a harmonica inclosed within an additional casing, and Fig. 6 an end view thereof.

Referring to the drawings, A represents a harmonica of any suitable size or pattern, and B a part of the casing made in somewhat tubular form and bent as shown in section in Fig. 3—that is, the top plate $a$ is bent to form an inwardly-extending flange $b$, leaving a groove $b'$, in which fit the rods $c$, secured to the end caps D. The casing B is provided with the converging sides $e$, the extreme lower edges of the sides $f$ being rounded or curled to lend thereto a finished appearance. Between these sides $e$ fits the upper portion of the harmonica A, and over the ends of the same fit the caps D D, said caps also extending over the ends of the casing B, as illustrated in Figs. 1 and 2. By reason of the rods or wires $c$ fitting in the groove $b'$ in the casing these caps D may be pulled outwardly, as shown in dotted lines in Fig. 2, to allow of the insertion of the harmonica between the sides $e$ of the casing B. After the harmonica is thus placed in position the caps D are pushed inwardly until they overlap the upper side or plate of the casing B and the lower side of the harmonica, as indicated in Fig. 2, said harmonica being thus inclosed within the casing. In order to hold the harmonica in position and prevent any shaking or movement thereof, I secure to one or more of the rods $c$ the springs $d$, the tendency of which is to bear upon the upper side of the harmonica and hold the same tightly in the caps D, as illustrated in Fig. 2.

In the casing B is formed an opening leading into the chamber F, formed of the sides $g$, converging toward their upper end, and to which upper end is secured the funnel H, opening into said chamber F. It will thus be understood that when the parts are in their proper position the sound from the harmonica will pass into the chamber F and out through the funnel H. To withdraw the harmonica from the casing, it is simply necessary to slide outwardly the caps D, as indicated in dotted lines in Fig. 2, whereupon the harmonica A may be withdrawn from the converging sides $e$ of the casing B. To insert the harmonica, it is simply necessary to force the upper side thereof between the converging sides $e$ and then to push inwardly the caps D until they overlap the casing B and ends of the harmonica, as before described.

If desired, a second casing I may be utilized for inclosing the sides of the harmonica, said second casing consisting of the sides $h$, the upper side of said case being open for insertion of the harmonica and the lower side provided with a slot $i$ for exposing the openings in the harmonica. After the harmonica has been slipped in between the sides $h$ of the casing I said casing, with its inclosed harmonica, is then inserted into the casing B, as before described, or, if desired, it will be understood without further illustration that one edge of the casing I may be hinged to the upper casing B instead of being entirely separate therefrom. It will also be understood without further illustration that rubber bands may be passed around the ends and sides of the harmonica in order that the latter may be caused to fit tightly within the casing and prevent any escape of the air around said sides and ends.

Having fully described my invention, what I claim as new, and desire to secure by Letters Patent, is—

1. The casing of a harmonica, consisting of an upper casing B provided with a groove in its top side and formed with the chamber F and funnel H, of caps D having rods $c$ secured thereto and adapted to slide in said groove formed in said casing, whereby said caps may be pulled outwardly and the harmonica inserted or withdrawn from said casing, substantially as described.

2. In a casing of the character described, the combination with the upper casing B formed with a groove in its upper side, and with converging sides adapted to grasp the upper portion of a harmonica, and with a chamber F and funnel H, of caps D adapted to fit over the ends of said upper casing and over the ends of the inclosed harmonica, and provided with rods C adapted to slide in said groove in said casing, and springs located in the upper portion of said casing for holding the harmonica down tightly on said caps D, substantially as described.

Signed at New York, in the county of New York and State of New York, this 22d day of November, A. D. 1900.

PIETRO ORLANDO.

Witnesses:
WILLIAM P. GOEBEL,
M. VAN NORTWICK.